J. P. REMINGTON.
PACKAGING MACHINE.
APPLICATION FILED APR. 1, 1913.
1,130,630.
Patented Mar. 2, 1915.
10 SHEETS—SHEET 3.
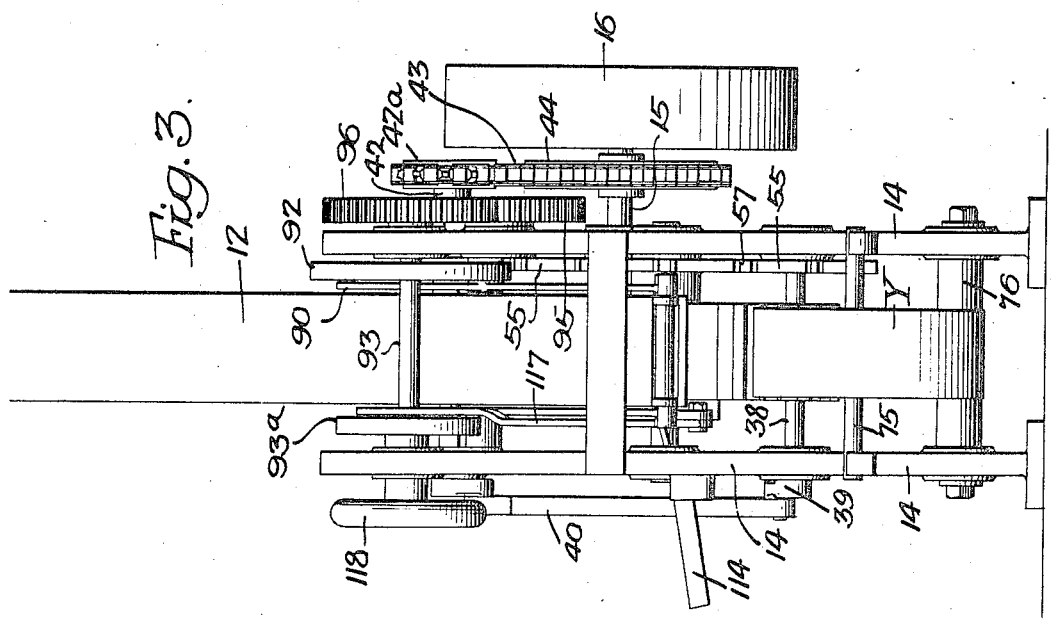
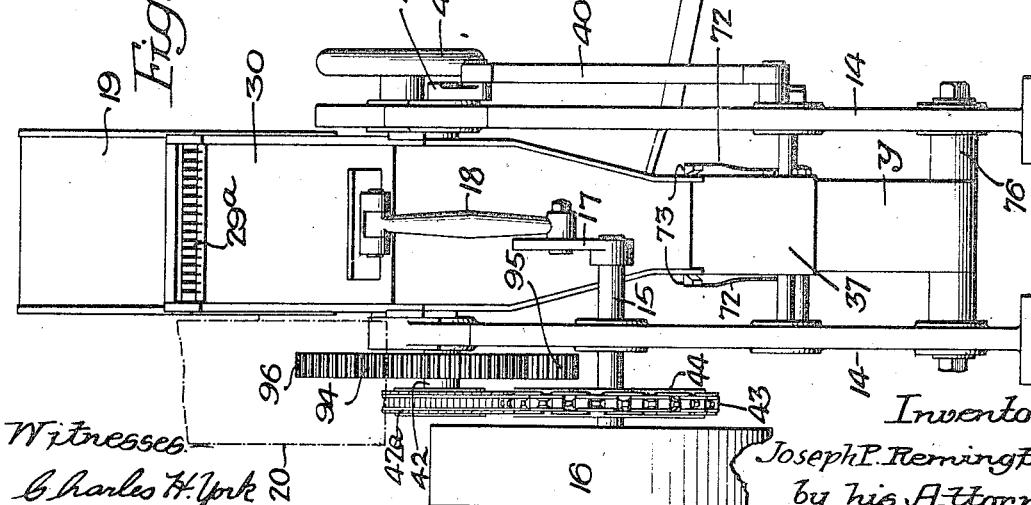

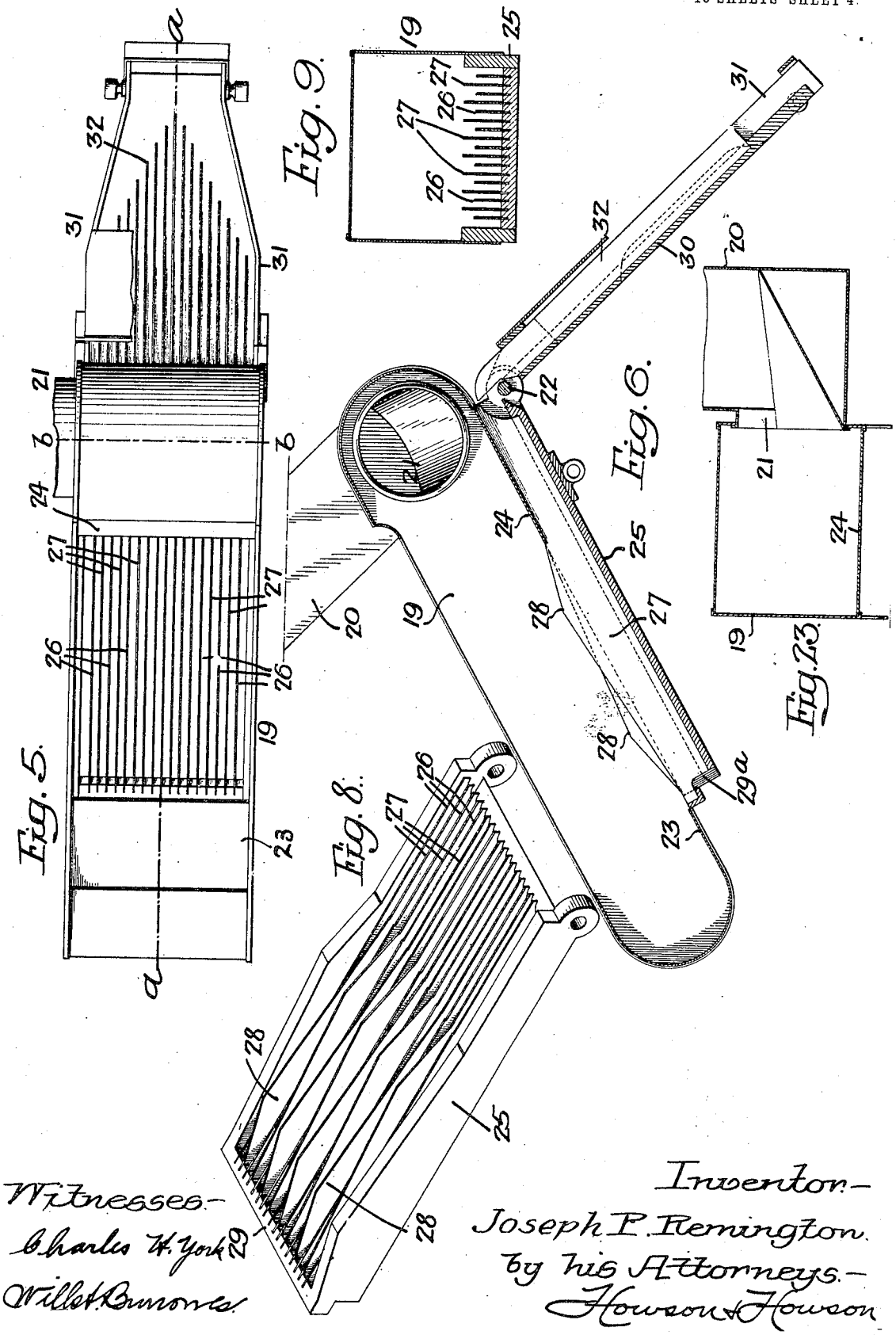

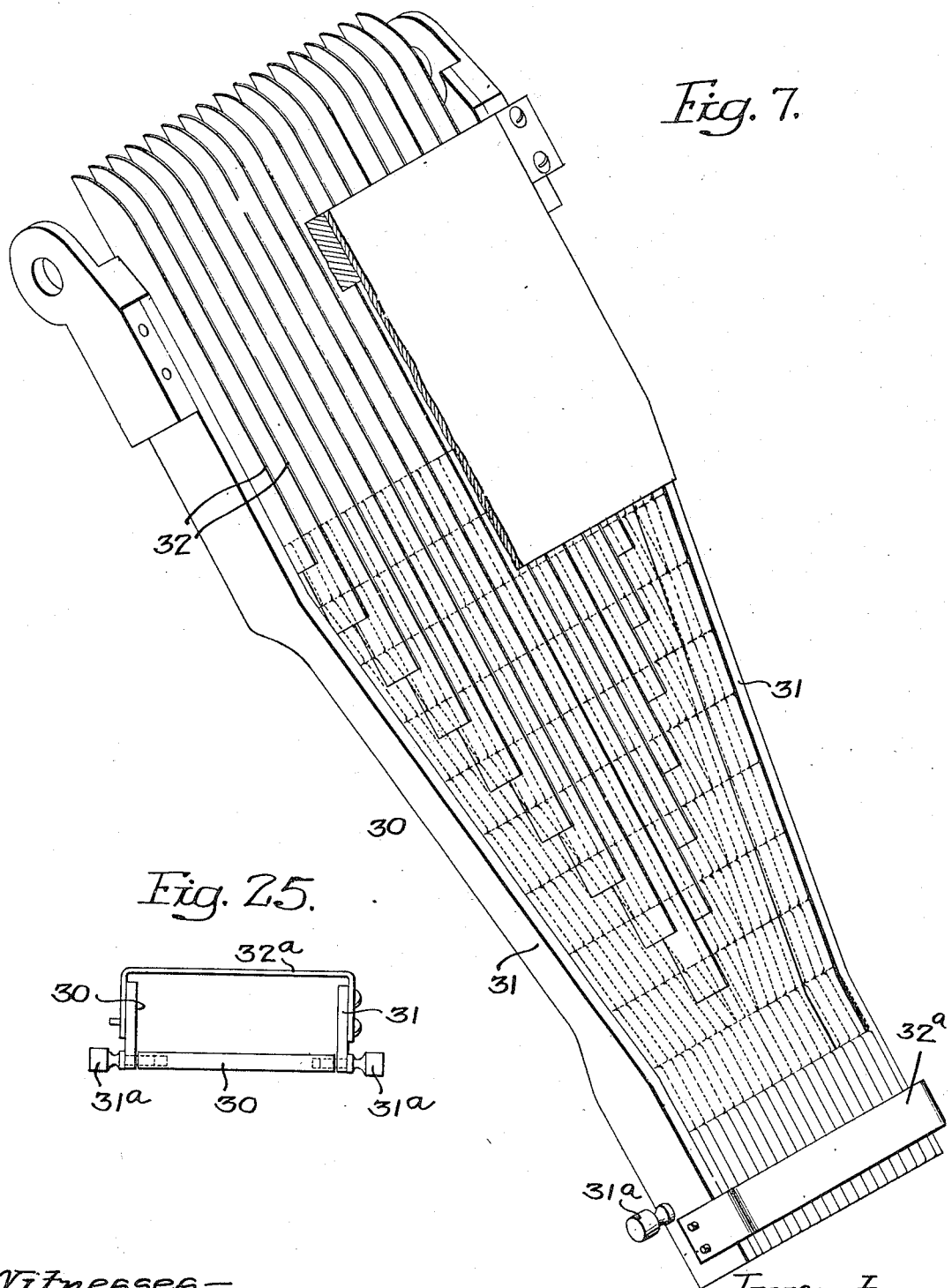

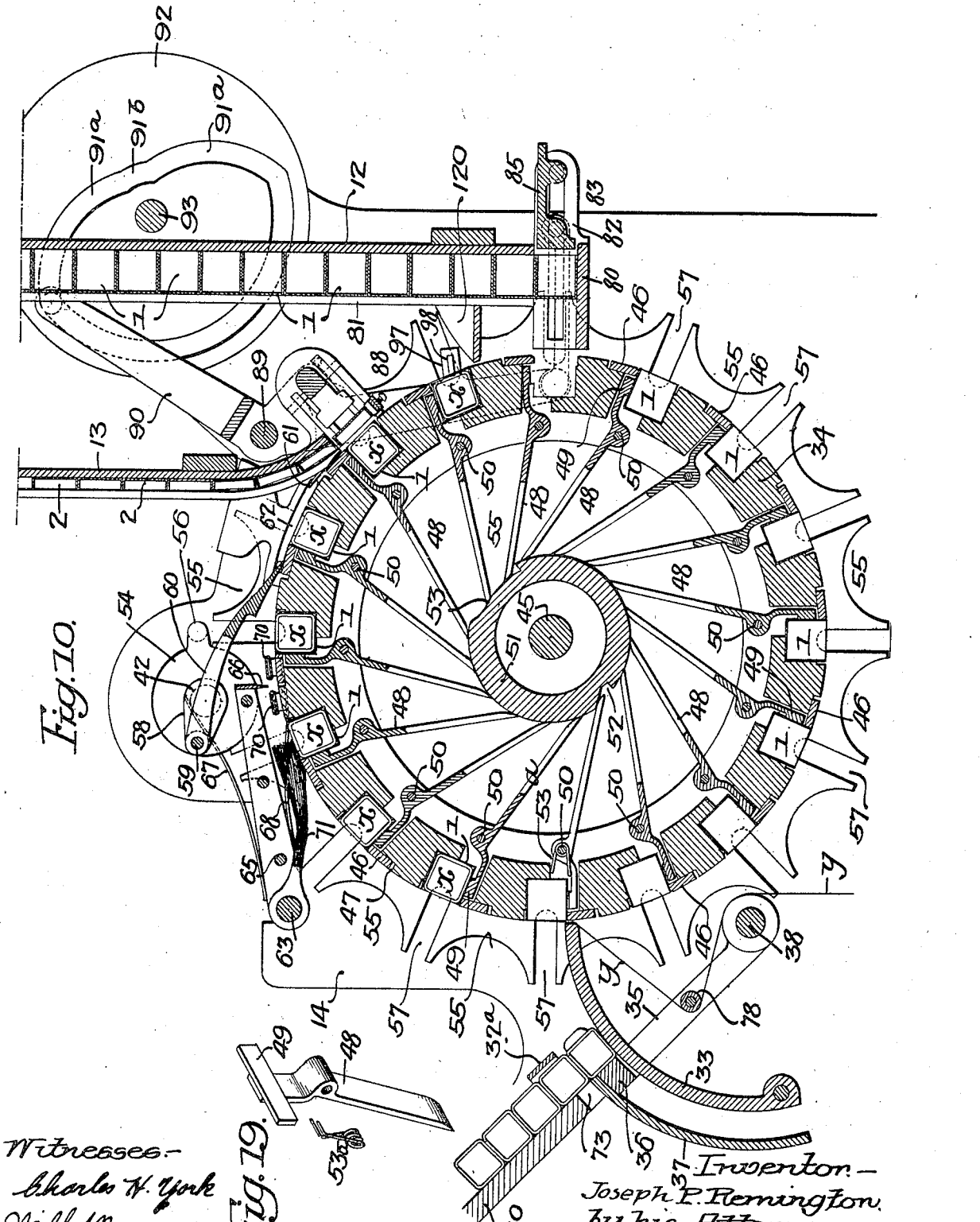

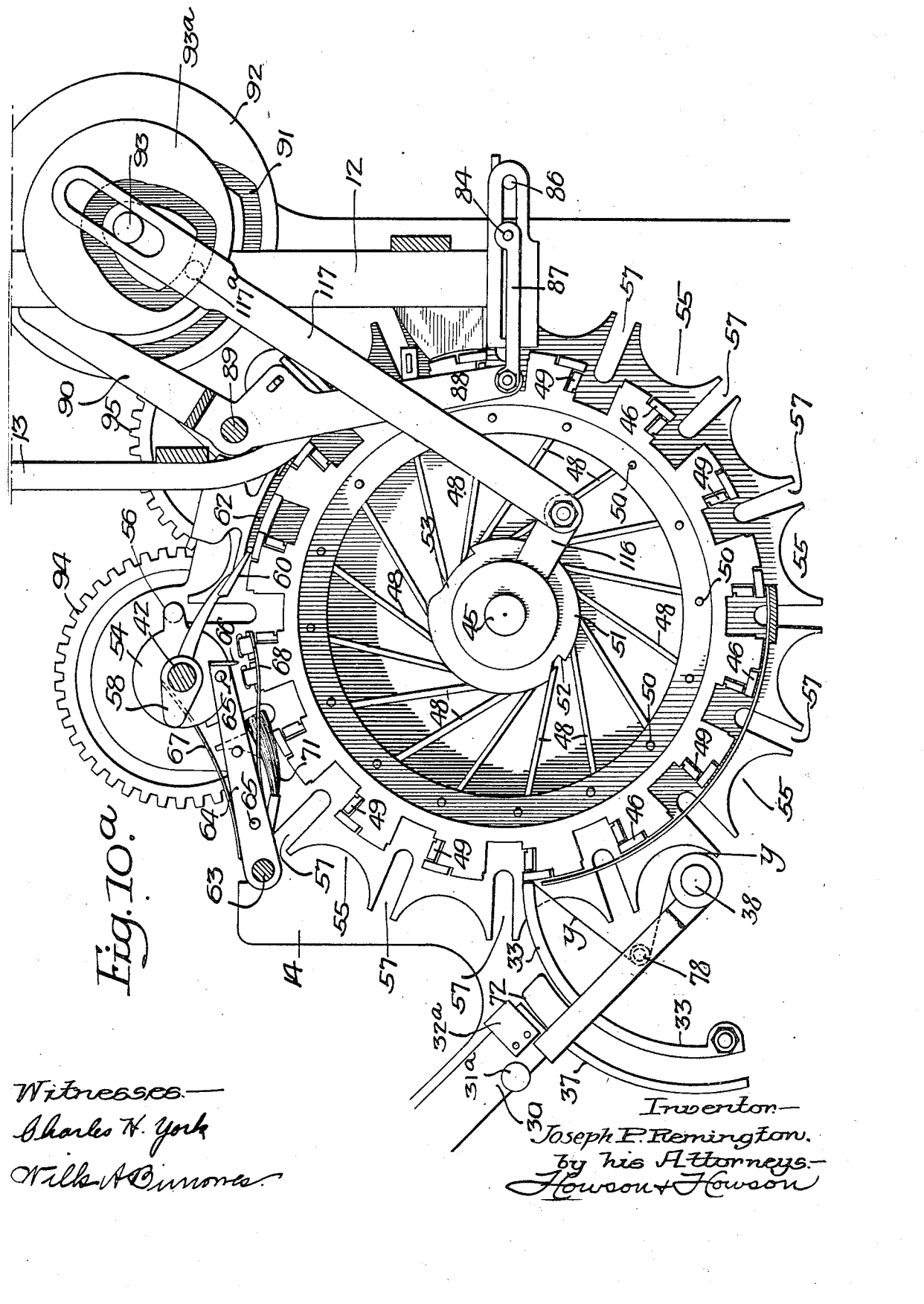

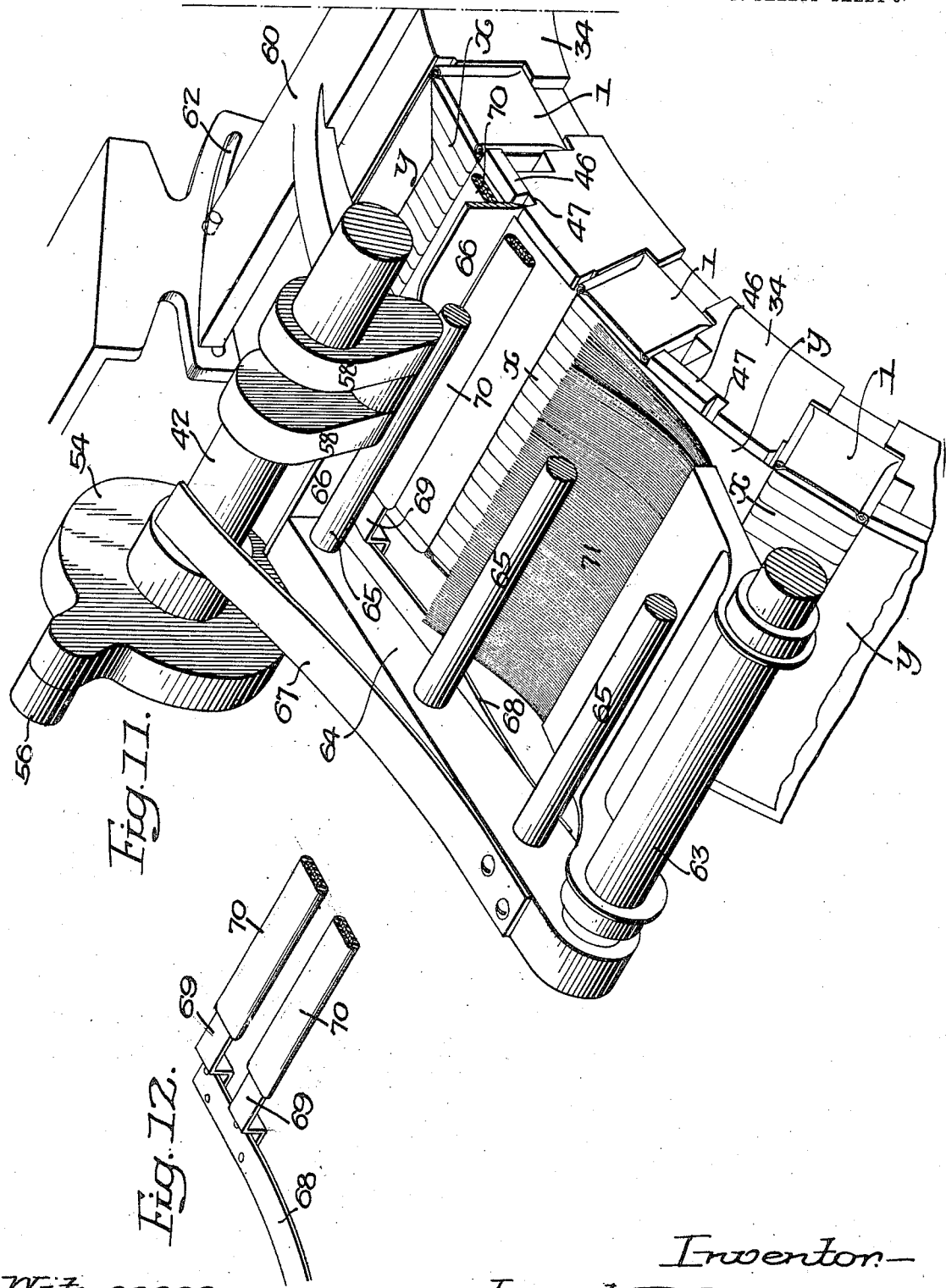

J. P. REMINGTON.
PACKAGING MACHINE.
APPLICATION FILED APR. 1, 1913.

1,130,630.

Patented Mar. 2, 1915.
10 SHEETS—SHEET 9.

Witnesses:
Charles N. York
Willis H. Simonds

Inventor:
Joseph P. Remington
by his Attorneys:
Howson & Howson

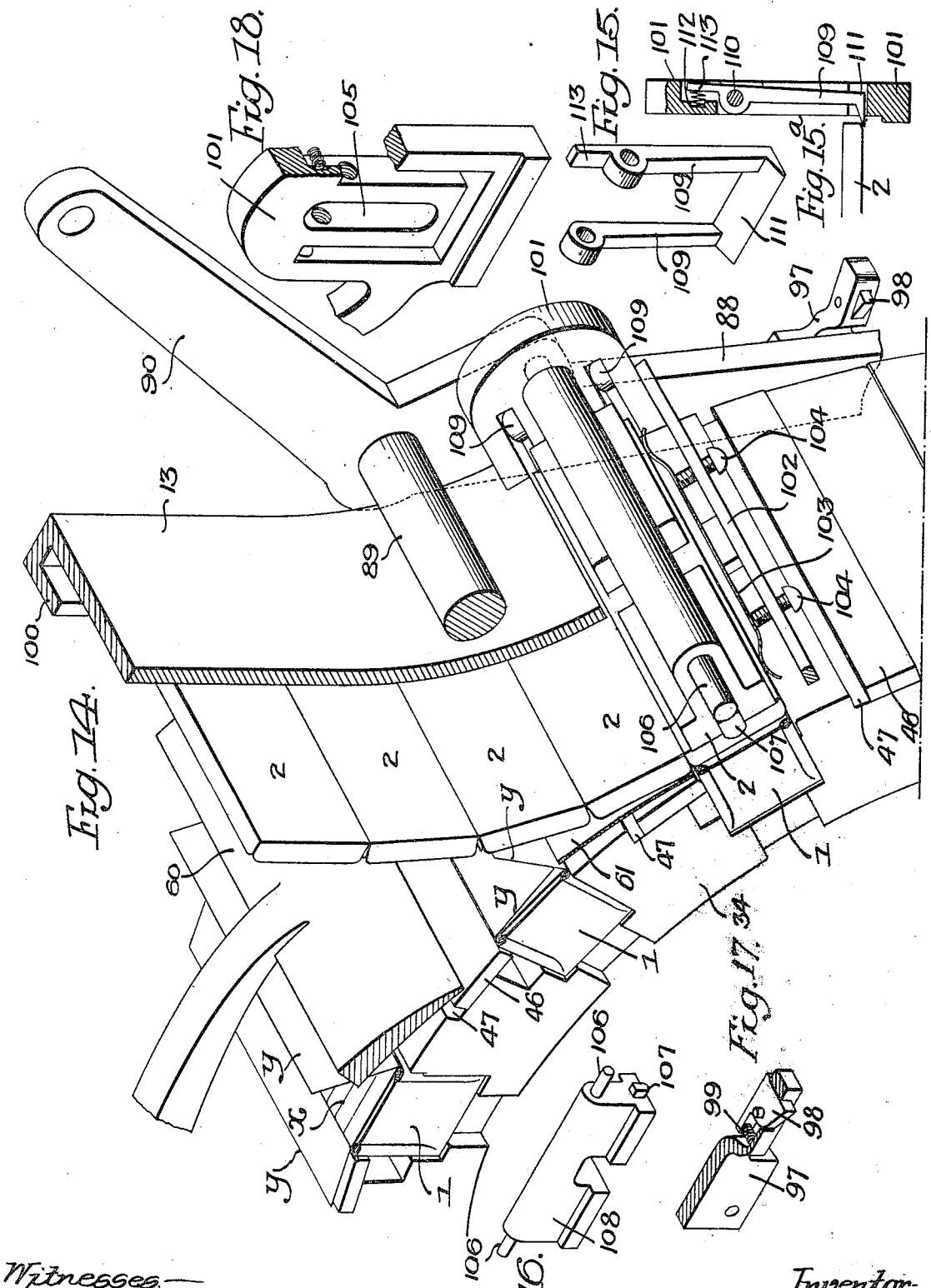

UNITED STATES PATENT OFFICE.

JOSEPH PERCY REMINGTON, OF PHILADELPHIA, PENNSYLVANIA.

PACKAGING-MACHINE.

1,130,630.     Specification of Letters Patent.     Patented Mar. 2, 1915.

Application filed April 1, 1913. Serial No. 758,237.

*To all whom it may concern:*

Be it known that I, JOSEPH PERCY REMINGTON, a citizen of the United States, residing in Philadelphia, Pennsylvania, have invented certain Improvements in Packaging-Machines, of which the following is a specification.

One object of my invention is to provide a machine which shall be capable of automatically filling a succession of cases or boxes with tablets or other bodies of predetermined size and thereafter placing lids upon the filled boxes; the invention also contemplating mechanism whereby a lining of paper is introduced into each box, preferably by the act of placing in the box the tablets with which it is to be filled, as well as novel means for cutting off successive lengths of the paper for such linings from a web of the same and folding the paper ends over the tablets in each box so that said ends lie in a flat position thereon prior to the application of the lid.

Another object of the invention is to provide a machine of the above noted type with novel means for continuously assembling predetermined numbers of tablets in the form of successive charges for filling boxes carried by a suitable magazine, said invention contemplating means for separating the powder and broken tablets from the perfect tablets prior to their assembly.

The invention further includes novel means for receiving a mass of tablets and thereafter assembling and condensing them so that they are delivered in the form of a series of rows each consisting of a predetermined number of tablets lying parallel with each other.

I also desire to provide a machine of the above noted type with a novel form of magazine for receiving and holding boxes to be filled, and which shall include novel means for clamping said boxes in place at certain times and releasing them at other times, as well as novel means for introducing said boxes to and ejecting them from said magazine.

It is further desired to provide a packaging machine with novel means for feeding box covers and thereafter successively applying them to filled boxes, the invention also including means for cutting the successive lengths of paper for lining the boxes, as well as an improved device for transferring successive rows of tablets from the assembling and condensing mechanism to the boxes in the magazine.

Figure 1:
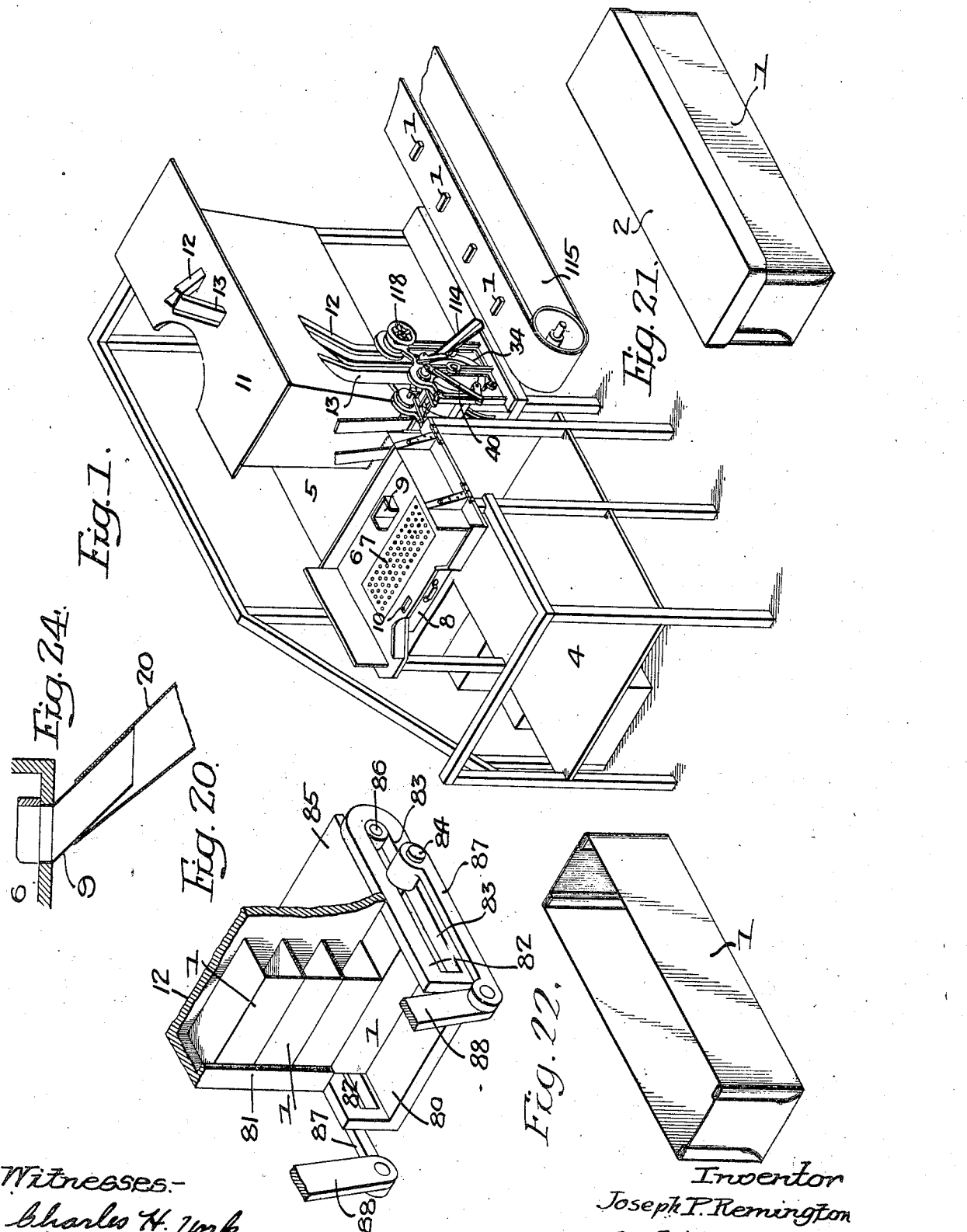
Figure 2:
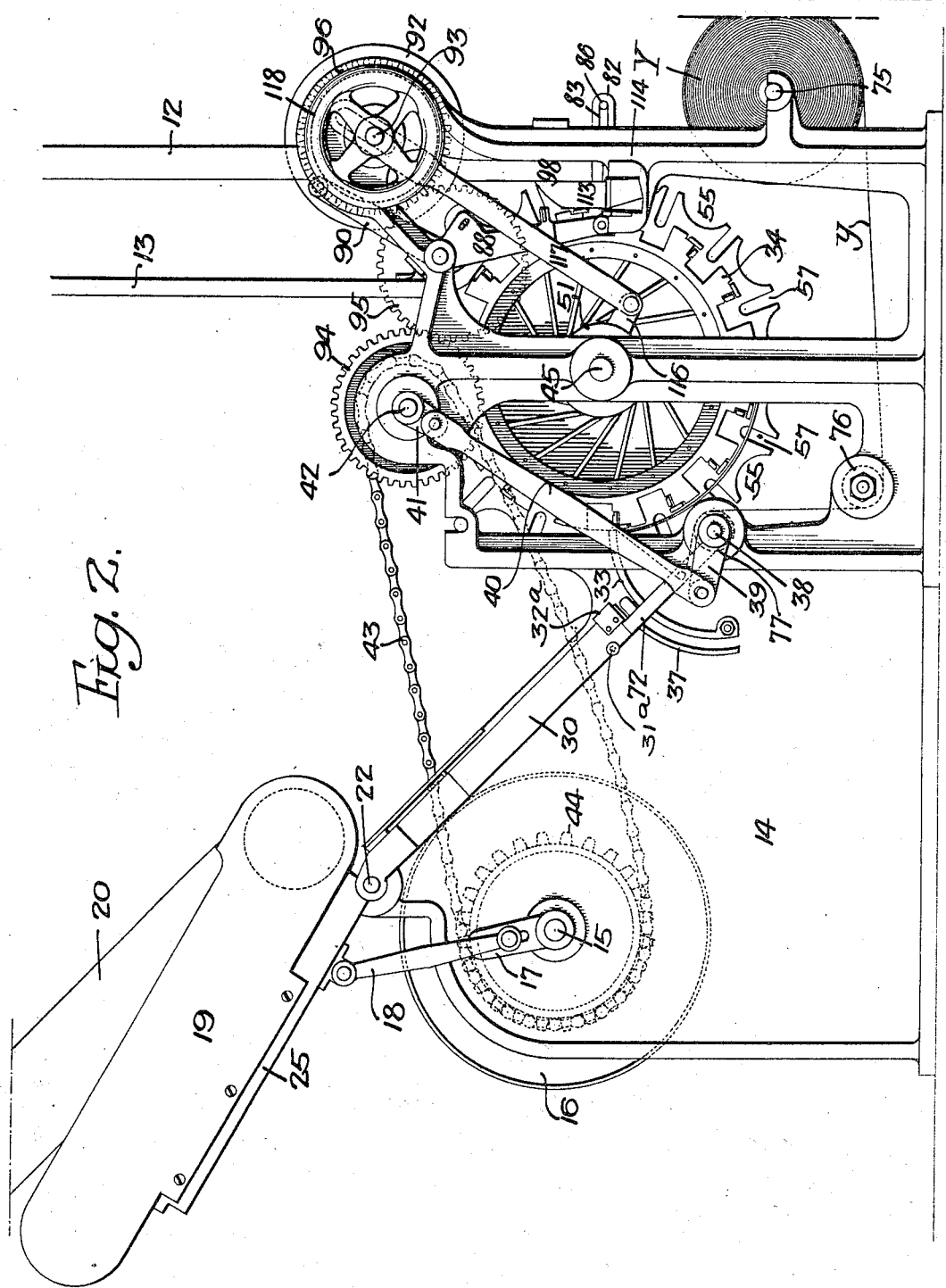
Figures 13, 13A:
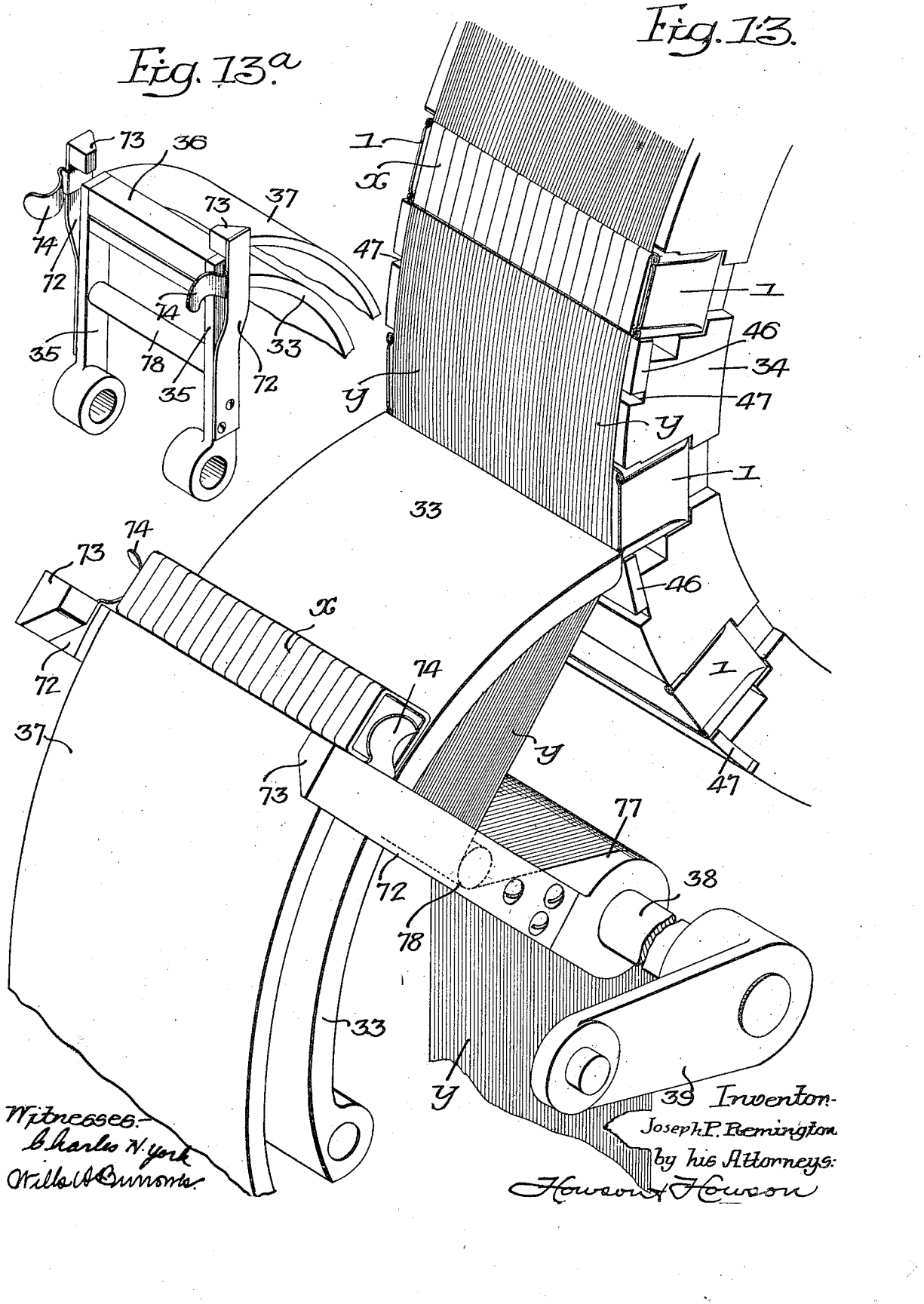

These objects and other advantageous ends I secure as hereinafter set forth, reference being had to the accompanying drawings, in which, Figure 1 is a perspective view illustrating the general construction of my packaging machine; Fig. 2 is a side elevation on a larger scale of the main portion of the machine shown in Fig. 1; Figs. 3 and 4 are elevations of the ends of the machine; Fig. 5 is a plan of the tablet sorting device forming part of my machine; Fig. 6 is a longitudinal section on the line $a$—$a$ Fig. 5; Figs. 7 and 8 are pespective views of the tablet condensing and assembling devices respectively; Fig. 9 is a transverse section on the line $b$—$b$ Fig. 5; Fig. 10 is a vertical section of the main portion of the machine, illustrating the construction and operation of the mechanism constituting the same; Fig. 10$^a$ is a side elevation of the main part of the machine; Fig. 11 is a perspective view, on an enlarged scale, illustrating the paper cutting and folding mechanism with certain of the parts associated therewith; Fig. 12 is a fragmentary perspective view of the paper clamping device; Fig. 13 is a full size fragmentary perspective view of the box filling mechanism; Fig. 13$^a$ is a perspective view showing the detail construction of the tablet conveyer; Fig. 14 is a perspective view, partly in section, showing the capping mechanism and certain associated parts; Figs. 15 and 15$^a$ are respectively a perspective and a vertical section of a part of the lid supporting mechanism; Figs. 16, 17 and 18 are detail perspectives, the last two partly in section, showing the detail construction of portions of the lid applying and ejecting mechanism; Fig. 19 is a perspective view of one of the box clamping levers; Fig. 20 is a fragmentary perspective, showing the box feeding mechanism; Figs. 21 and 22 are perspective views of a filled and covered box and of a box without its lid respectively; Fig. 23 is a vertical section showing the connection between the hollow arm and the assembling container; Fig. 24, is a fragmentary vertical section showing the connection between the tablet supply chute and the hollow arm, and Fig. 25 is a transverse section of the lower end of the tablet condensing device.

In Figs. 21 and 22 of the above drawings I have illustrated a box 1 which it is desired in this instance to automatically fill with relatively thin tablets of square outline, the box in this case being elongated in form and of a substantially square section. The box cover or lid is indicated at 2 and it is desired that a definite number of tablets, (in the present case, eighteen), of the form above indicated, shall be placed in the box with a lining $y$ (Figs. 13 and 14), of paper extending down one side of the box, under the tablets and up the other side.

The machine for assembling the tablets, placing them with the paper in the box, and then placing the cover on the box is indicated generally in Fig. 1, in which 4 and 5 are platforms for two operators, there being a table 6 above the platform 5, for the reception of the tablets as they are delivered from a tablet making machine or other source of supply. This platform is provided with a perforated plate 7 set flush with its top surface and has a drawer 8 extending under said plate to catch dust or small broken pieces passing into it from the mass of tablets on the table, it being understood that the latter are moved by the operator over said plate prior to their delivery to a chute 9. There is also provided an opening 10 leading directly into the drawer 8 into which the operator may deliver any larger sized broken pieces. Adjacent the second platform 5 is a second table 11 for the reception of boxes and lids, there being a chute 12 for the reception of the former and a second chute 13 into which the latter are fed, both extending through and projecting upwardly from said table.

Referring first to the means for assembling predetermined numbers of tablets in successive rows ready for delivery to boxes,—I have illustrated the various parts in Figs. 5 to 9 inclusive, and 23, 24 and 25. In Figs. 2 and 4 there are shown portions of the main machine frame, which for the most part consists of two substantially parallel side members 14 connected or braced together in any suitable manner and providing bearings for a main shaft 15 to which is fixed a driving pulley 16 or other suitable source of power. Also fixed to said shaft is a crank 17, which through a connecting rod 18 is intended to oscillate an elongated container 19 in the manner hereafter described. The chute, whose upper end is indicated at 9 in Fig. 1, is movably connected, as shown in Fig. 24, to a hollow arm 20 whose lower end is provided with a lateral cylindrical extension 21 on which is journaled one end of the elongated container 19. This latter is hinged or pivoted to a portion of the frame 14 by a spindle or pin 22; the arrangement being such that tablets delivered to the hollow arm 20 find their way through the lateral extension 21 into said container 19. The ends of this container are preferably rounded as shown in Fig. 6, and its bottom, although cut away at the middle, has portions 23 and 24 at its opposite ends on which tablets may temporarily rest.

Below the bottom and permanently attached in any suitable manner to the body of the container 19, is an assembling trough 25 consisting of a shallow box within which are mounted two series of thin vertically set parallel plates or partitions 26 and 27 extending from one end of said trough to the other. The portions of the plates under the part 24 of the bottom of the container 19 are all of the same height, but the remaining parts have their upper edges extended through the opening above the bottom of said container as indicated at 28 in Fig. 8; the extensions of alternate ones of said plates 27 being gradually inclined upwardly from the edge of the bottom part 24 and thereafter descending abruptly to the closed end 29 of the trough 25, while the remainder are inclined upwardly with comparative abruptness from the part 24 and thereafter descend gradually toward the end 29 of said trough.

A condensing and delivery trough 30 extends downwardly from the hinge or pivot 22 as shown in Figs. 2 and 6, and this consists of an inclined plate having sides 31, which while parallel at the upper end of said plate, converge as they approach the lower end thereof, until their distance apart is equal to the length of each of the rows of tablets which the boxes 1 are designed to receive. Thereafter for a short distance the lower portions of the side members 31 are parallel (Fig. 5), and as shown in Fig. 25, may be moved toward or from each other to accommodate different thicknesses of tablets by means of adjusting screws $31^a$. The lowest parts of the side members 31 are connected by a tablet retaining plate $32^a$ which is rigidly attached to one of said members and movably engaged with the other, so as to permit of the adjustment by the screws $31^a$.

Mounted within and fixed to the bottom of the trough 30 is a series of parallel, relatively thin vertical plates 32 of which that lying in the middle longitudinal plane of the trough is the longest, (Fig. 7). The plates on either side of this middle plate successively decrease in length until the shortest terminates in the neighborhood of the point of junction of the upper part with the adjacent inclined side 31. It will be noted that the design of the side members of the trough 30 and the lengths and proportions of the division plates 32 will depend upon the dimensions of the tablets to be assembled and condensed into rows, although the arrangement must be such as to prevent one or more of the tablets of any row getting between any two of the tablets of a lower row and thus wedging or jamming so as to prevent their downward flow or movement under the action of gravity.

It is noted that there is such a number of the plates or partitions 32 as to provide the same number of lines of movement for tablets in an edgewise position, as there are tablets to be placed in each box, there being in the present instance eighteen such feeding channels. By means hereafter described, the lowermost lines or rows of assembled tablets are successively removed and the inclination of the delivery trough 30 is such that after each such removal, the mass of tablets therein moves downwardly for a distance equal to the length of an edge of one of the tablets. The partitions or plates 32 of the condensing trough have their upper ends curved concentrically with the pivot or hinge pin 22 as well as with the plates 26 and 27, which lie respectively in the same planes as said plates 32 and have their adjacent ends under-cut (preferably concentrically with the hinge pin 22) so as to respectively receive the ends of the plates 32 when the container 19 is oscillated on said hinge pin.

By means of this tablet assembling and condensing mechanism successive rows or lines of tablets are delivered to the lower end of the trough 30, where the lowermost row is brought to rest on the surface of a cylindrically curved plate 33 which passes under the lower end of said trough and at one edge terminates immediately adjacent a rotating magazine 34. Concentric with the curved surface of the plate 33 I provide a cross shaft 38 properly supported in bearings in the side members 14 of the main frame and carrying two parallel arms 35 connected at their outer ends by a cross bar 36 whose innermost edge is parallel with and immediately adjacent the outer curved surface of the plate 33. Mounted on and extending rearwardly from this cross bar 36 is a second curved plate 37 whose outer surface is preferably spaced away from the outer surface of the first plate 33, with which it is parallel, by a distance substantially equal to the width or breadth of one row of tablets, so that when the shaft 38 is actuated to move the arms 35 with the cross bar 36 and plate 37 toward the magazine 34, said plate and bar carry with them the lowermost row of tablets indicated at $x$ and slidably support the next lower row, which is held from being drawn out, when the first row is removed, by the bridge piece $32^a$.

For oscillating the shaft 38 I provide it with a crank arm 39, which through a rod 40 is connected to a crank arm 41 fixed to a shaft 42 journaled in the top parts of the side members of the frame 14 and also carrying a sprocket wheel $42^a$ connected through a chain 43 with a second sprocket wheel 44 on the main driving shaft 15, Fig. 2.

The magazine 34 (Fig. 10) will be seen to consist of a wheel-like structure rotatably carried on a shaft 45 extending between the side members 14 of the frame and having in its peripheral surface a series of transversely elongated recesses of substantially square section designed for the reception of the boxes to be filled. Adjacent one long side of each of these recesses a plate 46 is mounted in a suitable depression of and substantially flush with the cylindrical surface of the magazine structure, and is spaced away from one side of such depression to form a transversely extending slot 47 for a purpose hereafter noted.

In order to clamp the boxes 1 within the recesses of the magazine, I provide each of the latter with a clamping device in the form of a lever 48, (Fig. 19), having a cross bar 49 fixed to the end of one of its arms, and so pivoted to the magazine structure by a pin 50 that said cross bar extends immediately adjacent and parallel with one side of the box-receiving recess. The end of the second arm of each lever is preferably beveled or sharpened as shown, so as to engage the surface of a rotary cam 51, loosely mounted on the shaft 45 within the magazine structure 34, the arrangement being such that the various levers 48, when mounted on their pivots, have the inclined ends of their long arms resting upon the generally cylindrical exterior surface of said cam. The latter has fixed to it an arm 116, (Fig. $10^a$), which is pivoted to a link 117 whose upper end is slotted to receive a shaft 93 on which it is slidably guided. This link carries a roller $117^a$ operative in the groove of a cam $93^a$ fixed to said shaft 93, so that as the latter rotates said cam is periodically oscillated on the shaft 45.

The arrangement and proportioning of the parts is such that as long as the ends of the levers 48 ride upon the cylindrical portion of the cam 51, the cross bars 49 carried on their short arms occupy positions such as to clamp the boxes 1 within the recesses of the magazine, and in order to periodically permit the levers to release the boxes or move to a position in which it is possible to introduce the tablets thereto, I provide the cam with two recesses or depressions 52 and 53, of which the latter is of greater extent than the former. Each of the levers at all times tends to move to its box-releasing position under the action of a spring $53^a$ preferably mounted on its pivot 50 and acting between the adjacent portion of the magazine structure and its short arm.

For alternately rotating the magazine structure and locking it to prevent movement, I provide any suitable form of operating mechanism such as a Geneva gear, illustrated in the present instance as consisting of a disk 54 mounted on the transverse shaft 42 and provided with a laterally projecting pin 56 designed to enter radial slots 57 in a plate attached to or forming part of the magazine structure, which between said slots is provided with circularly curved recesses 55 for the reception of the circularly curved edge of said disk 54. The shaft 42, (Fig. 11), is provided with a crank 58 on whose pin is loosely mounted a folder 60 in the form of an arm whose outer extremity is transversely elongated to the width of the magazine structure 34 and is sharpened at its outer edge so as to be capable of passing under a folding apron formed by a plate 61 extending between the side members of the frame immediately above the surface of the magazine structure.

Obviously when the shaft 42 is turned, the folder 60 is given a reciprocating movement toward and from the apron 61, its sharpened or inclined edge being held down and guided by means of a projecting pin at each end and slidable within guide-ways 62 provided in the adjacent portions of the main frame.

At a suitable point between the condensing trough 30 and the transverse shaft 42 there is provided a transverse bar 63 on which is mounted a frame consisting of a pair of parallel side bars 64 connected by transverse rods 65 and carrying at its outer end a knife blade 66 whose cutting edge is immediately adjacent the external surface of the magazine structure 34. A strip 67 of spring metal attached at one end to the arms 54, has its opposite end bearing upon the shaft 42 and serves to normally hold the knife 66 in an elevated position. The crank 58, however, is so placed on the shaft 42 and is of such dimensions, that as said shaft rotates, it periodically comes into engagement with one of the cross bars 65 and forces the knife frame downwardly to such an extent as to cause the blade 66 to enter one of the transverse slots 47 of the magazine structure 34. As heretofore noted, this knife 66 is designed to cut the paper lining for the boxes into suitable lengths, and for the purpose of clamping said paper in a taut condition across one of the slots 37 just prior to its engagement by said knife, I mount on the under side of each of the side bars 64 a spring strip 68, connecting the ends of these strips, (Fig. 12), by a pair of bars 69. Each of said bars has a rubber or other more or less yielding cover 70 and the arrangement of parts is such that when the knife frame is in its elevated position, the bars just clear the top surface of the magazine structure, though as the said frame is depressed, they are brought into engagement with the web of paper extending over the adjacent portion of said structure and clamp it tightly to said surface. Thereafter as the knife blade 66 passes between the bars 69 into one of the slots 47, it strikes and cuts the tightly stretched paper.

Mounted on the cross bar 63 which supports the knife frame is a dust brush 71 designed to rest upon the web of paper and the rows of tablets in the boxes as the magazine structure 34 is turned, and remove therefrom any dust which may be thereon.

From Figs. 13 and 13ª, it will be seen that each of the arms 35 on the shaft 38 has fixed to it, adjacent said shaft, a radially extending spring strip 72, on whose outer end is fixed a beveled block 73 projecting over the adjacent end of the curved plate 37. The beveled portions of these blocks are so placed that when said plate occupies the position shown in Fig. 10, with its front edge to the rear of the plane of the bottom of the delivery trough 30, said blocks engage the sides 31 of said trough and thereby separate the strips 72. These latter carry forwardly projecting spring fingers 74 which are thus temporarily moved apart so that a row of tablets is free to slide between them on to the fixed curved plate 33. As the shaft 38 is turned to move the plate 37 toward the magazine 34, the beveled blocks 73 are moved out of engagement with the sides of the trough, thereby permitting the spring strips 72 to press the fingers 74 into engagement with the row of tablets, and holding them in a line as they are moved over the fixed plate 33.

The paper for lining the boxes 1 is supplied in the shape of a roll Y carried on a spindle 75 supported at the rear end of the frame of the machine. From this roll the paper web y passes over a guide roll 76 to a roll 77 mounted on a shaft 38, thence around a guide rod or roll 78 carried by the arms 35, and between the magazine structure 34 and the adjacent edge of the plate 33, beyond which it extends alternately into the boxes and over the intermediate portions of said magazines.

For feeding the empty boxes to and placing them in the magazine 34, I provide the mechanism shown in Figs. 10 and 20, from which it will be seen that the substantially vertical lower end of the chute 12 terminates in a substantially horizontal plate 80, said chute being open on its forward side although the edges 81 of its opening are flanged toward each other for the purpose of retaining the empty boxes 1. The plate 80 is provided with side members 82 longitudinally slotted at 83, for the reception of pins 84 which project through said slots from a pusher 85, this latter also having two other supporting pins or rollers 86 likewise operative in the slots 83. The back of the chute 12 is cut away to permit of the passage of said pusher toward and from the magazine, and for actuating this pusher there are links 87 (Fig. 10ª) connecting the pins 84 with the arms 88 of a pair of levers journaled on a transverse rod or spindle 89. One of these levers has a second arm 90 provided with a roller operative in the groove 91 of a cam 92 fixed to a transverse shaft 93 driven from the shaft 42 by gears 94, 95 and 96. It will be noted that the groove in this cam, for about one half of its extent, is substantially concentric with the shaft 93, so that while the roller on the end of the lever arm 90 is engaged by this part of said groove, the pusher is not actuated but remains in the position shown in Fig. 10. The remainder of the cam groove, however, consists of two substantially similar portions 91ª having a relatively steep eccentricity, preferably united by a short length 91ᵇ substantially concentric with and immediately adjacent the shaft 93. The lever arms 88 each carries at a proper distance from its supporting spindle 89, a projecting piece 97 having pivoted to it a spring actuated pawl 98 (Figs. 14 and 17), and these pieces are so mounted as to project parallel with and immediately adjacent the opposite sides of the magazine 34, while the pawls 98 are so designed that when the lever arms 88 are swung toward the shaft 45, they first engage the ends of a box carried by the magazine structure and are thereby turned on their pivots against the action of the springs 99 until they finally spring outwardly and project toward each other under the bottom of the box. Thereafter, the rearward movement of the lever arms 88 brings the flat faces of said pawls into engagement with the opposite ends of the box and forces the latter out of the recess in the magazine.

The box lids, as before noted, are delivered through a chute 13 which like the chute 12, is open on one face and provided with flanges 100 for retaining the lids or covers while permitting of their inspection. The lower end of said chute is curved from a substantially vertical line until it is almost tangent with the cylindrically curved surface of the magazine, (Fig. 14), and it approaches the latter between the box delivering chute and the folder 60. It terminates immediately in front of a pair of side members 101 carried by the main frame and connected by a cross bar 102, at the middle of whose front face is fixed a strip 103 of spring metal, designed to provide a buffer for the lids as they are delivered from the chute. Screws or bolts 104 are mounted in the cross bar 102 adjacent its ends so as to provide means whereby the end portions of the strip 103 may be forced to a greater or less extent toward the end of the chute in order that the covers or lids discharged from the latter may be properly positioned. The side members 101 extend radially away from the magazine structure 34 to which they are adjacent and each of them is provided with a slot 105, also radial of the magazine, for the reception of guide pins 106 and 107 projecting from the cover pusher 108 (Fig. 6). This latter is actuated from the two levers 88 which are respectively engaged by the guide pins 106 so that said pusher may be moved thereby toward and from the magazine, immediately adjacent the end of the chute 13. In addition to the above, each of the side members 101 has its inner face recessed for the reception of a frame 109, (Figs. 15 and 15ª), designed to temporarily support each of the box lids just before it is engaged by the pusher 108. Each of these supporting frames consists of a pair of arms pivoted to one of the side members 101 by a pin 110 and having their lower ends connected by a cross piece 111 whose upper face is beveled or inclined so that both frames will swing on their pivots or be forced apart when pressure is exerted on a lid 2 by the pusher 108. Said supporting frames 109 are each normally acted on by a spring 112, confined between an extension 113 of one of its arms and the adjacent portion of the member 101, to force the beveled lower portions toward each other into positions to support a lid.

Between the lower end of the chute 12 and the magazine 34, but above the line of movement of the pusher 85, is placed a transversely extending plate 120, (Fig. 10), one of whose ends is lower than the other and which is designed to discharge into a spout 114. Its lower end is so directed as to deliver filled and capped boxes upon a conveying belt 115, (Fig. 1), which may be supported and operated in any suitable manner adjacent one side of the machine, although it is obvious that if desired, other means may be provided for carrying away or receiving the boxes.

I also provide a hand wheel 118 fixed to the shaft 93 whereby the latter and with it the mechanism hereinbefore described, may be moved manually for purposes of adjustment or inspection.

Under operating conditions the driving pulley 16 is driven from any suitable source of power and a web $y$ of paper drawn from the roll $Y$, is passed around the guide rollers 76, 77 and 78, being thereafter carried between the magazine 34 and the adjacent end of the curved plate 33 and then drawn upwardly over the external surface of the said magazine. Through the chain 43 power is transmitted from the pulley 16 to the shaft 42, thus rotating the disk 54, which when the pin or roller 56 is operating in one of the radial recesses 57, intermittently turns the magazine 34 through a predetermined arc equal to the angular distance between the center lines of two adjacent box recesses, and for the rest of its revolution, locks said magazine from turning since its circular periphery lies within one of the circularly curved depressions 55 of the toothed plate heretofore described. A supply of boxes 1 is delivered into the chute 12 with their open sides adjacent the rear portion thereof, while covers 2 are fed into the chute 13 with their open faces directed toward the open side of said chute. Tablets of the proper dimensions are then delivered in quantity to the table 6 and after passage over the perforated plate 7 for the purpose of removing the dust and small broken pieces, are fed to the upper end of the fixed chute 7, from which they pass into the hollow arm or conduit 20 and through the outlet at the lower end thereof, into the sorting or assembling container 19. As heretofore described, this latter is continuously oscillated on its hinge 22 through the connecting rod 18, so that the mass of irregularly disposed tablets is alternately slid from one end of said container to the other. Obviously, however, when the tablets strike the upwardly projecting edges 28 of the strips or partitions 27, certain of them are necessarily tilted from a horizontal to an inclined position, and partly under the action of gravity as well as a result of the movement of the container, they fall between these strips, sooner or later assuming edgewise or vertical positions between the strips 26 and 27. As the container 19 is moved from the position shown in Fig. 6 to that shown in Fig. 2, all of those tablets which has assumed edgewise positions and are resting on the bottom of the supplementary or assembling trough 25, slide toward the hinge 22 under the false bottom 24, and more or less of them pass into the guide ways formed by the strips or partitions 32 of the delivery trough 30. It may be noted that the end of the assembling trough 25, farthest away from the hinge 22, is preferably perforated or slotted at one end as indicated at 29$^a$ to permit of the escape of dust and small particles of broken tablets The tablets delivered to the trough 30 (Fig. 7), slide down the guide ways therein until the lower and middle portions of said trough are filled with horizontally extending rows of tablets, though if desired, in starting the machine, this trough may be manually filled with the tablets in the positions indicated in dotted lines, and thereafter the continued oscillation of the container 19 will at all times maintain the guide ways filled. In the operation of the machine, the tablets are removed from the lower end of this delivery or condensing trough 30 in successive rows, and each time a row is removed, all of the remaining tablets move downwardly a distance equal to the length of the side of one tablet, it being noted that the various strips or partitions 32 so direct the tablets that as they move down, they are gradually allowed to approach each other until, after passing the longest and central partition, they lie in compact rows without intervening spaces. With my peculiar construction and arrangement of the partitions, the tablets at the outer ends of each row are first brought into engagement with each other and as they move down the partitions are gradually omitted, beginning with the outermost pairs, until finally the two middle tablets of the row are allowed to engage each other, thus completing the condensing of said row.

The lowermost row of tablets in the trough 30 rests directly upon the upper surface of the fixed curved plate 33 (Fig. 13), and at the beginning of a cycle of operations, the movable plate 37 lies to the rear of this row (Fig. 10). Thereafter when this plate is moved toward the magazine by the mechanism heretofore described, this bottom row of tablets is moved from under the next upper row which is held from displacement by the bridge piece 32$^a$ and is thereafter immediately clamped in a horizontal column by the spring fingers 74, so that its constituent pieces maintain a perfectly straight alinement. By the movement of the plate 37, said row is finally brought into engagement with the paper web which is stretched over the adjacent face of the magazine, and the roller 78 is so placed on the arms 72 that as said row engages the web and forces it into a box 1 which has previously been placed in a recess of the magazine, there will be provided exactly the desired amount of slack necessary to permit said paper to extend down one side of the box, across the bottom thereof, and up the other side.

At the time a box receiving recess of the magazine is immediately adjacent the line of movement of the pusher 85, the beveled end of the lever 48, whose cross piece 49 projects within this particular recess, lies within the depression or recess 53 of the cam 51, which is so operated and adjusted as to produce this result, so that said cross piece occupies its extreme open position in order that a box may be freely inserted. The cam 92 is so designed and timed that while the magazine is locked from movement by the Geneva gear heretofore described, the lever arms 88 move said pusher toward the magazine, causing it to transfer a box from the bottom of the chute 12 into an empty box recess of the magazine.

Shortly thereafter the Geneva gear causes the magazine to make a partial rotation equal in angular amount to the distance between two adjacent box recesses and just previous to this the cam 51 is moved through the arm 116, link 117 and cam 93$^a$ so as to cause the beveled end of the lever 48 belonging to the recess in which the box has just been placed, to move out of the recess 53 with the result that its cross bar 49 engages the adjacent side of said box and clamps it in the recess. Thereafter the magazine is intermittently moved until the box in the recess has been brought into the position with respect to the row of assembled tablets and the paper lining previously described, although it is noted that immediately before the row of tablets is inserted, the cam 51 so moves as to allow the end of the clamping lever 48 to drop into the same cam recess 52 thus releasing the side of the box and permitting the free entrance of the tablets. Just prior to the next movement of the magazine, the cam 51 causes the beveled end of the lever to again ride upon its cylindrical surface, thus not only clamping the box in the recess but also firmly holding the tablets in the box so that when a subsequent row of tablets is introduced into the next empty box, the paper web and hence the tablets therein are held from being drawn out of this first filled box.

As the plate 37 moves toward the magazine with a row of tablets, its curved outer surface prevents the succeeding row from dropping, and as it is moved toward the position shown in Fig. 10 after having placed a row of tablets in a box, the beveled blocks 73 strike the sides 31 of the delivery trough, moving the spring strips 72 with the fingers 74 away from each other, so that when the plate reaches its extreme rear position, the row of tablets heretofore held up by it is permitted to freely drop on to the plate 33; the various series of tablets in the said trough immediately moving downwardly as previously described.

In the case shown five boxes are thus successively lined with paper and filled with tablets, although the linings of these boxes are still continuous with each other. After the first filled box, however, has passed under the knife blade 66 and the paper clamping strips 77, the next downward movement of the knife frame 64—65 causes said strips to firmly press the web nearest said box against the adjacent surface of the magazine thus holding it taut immediately over the transverse slot 37. The knife blade 66 then descends and moves into said slot 47, cutting or breaking the paper in a straight line, so that the two ends thus formed project upwardly at an angle to the surface of the magazine. Thereafter the two next movements of said magazine bring the first filled box under the reciprocating folder 60, which, after moving over the projecting ends of the lining, moves toward the apron 61 and turns over the end nearest it so that this lies horizontally over the top surface of the tablets in the box. It will be understood that at this time the second end of the paper lining is projecting toward the apron 61 and as the magazine is moved to bring this first filled box under said apron, the latter turns over this second end, causing it to lie down over the first folded end as the folder is withdrawn by the crank 58.

At the time any particular box is having its paper lining forced into it by a row of tablets propelled by the movable plate 37, there are at least three filled boxes through which the uncut paper web extends and all of these are so clamped by the levers 48 that even the relatively great stress put on said web by the act of forcing it with a row of tablets into the box, is insufficient to dislodge the lining and tablets from the preceding boxes, although the necessary length is drawn from the slack provided by the forward movement of the arms 35. It is noted that the length of web necessary to provide this slack is drawn from the paper roll Y by the movement of these arms 35 away from the magazine.

After the ends of the paper lining have been folded over the row of tablets in a box, the latter is brought to rest in a position immediately under the pusher or capping plunger 108, which at this time is in the position shown in Fig. 10, with a box lid resting against the strip 103 and supported by the inclined surface of the cross bars 111. The same action of the lever arms 88 which moves the pusher or plunger 85 toward the magazine, likewise forces the capping plunger 108 toward the filled box, so that it is brought into engagement with the lid or cover 2 and by reason of its pressure thereon, forces the arms 109 to turn on their pivots against the action of the springs 112 and carries the cover inwardly toward the magazine onto the filled box, which is still clamped in place by the lever 48 belonging to the recess in which it is carried. By the time this filled and covered box has been brought to its next succeeding position by the intermittent movement of the magazine, the inclined end of its clamping lever 48 drops into the recess 53 of the cam 51 so that it no longer clamps the box in the magazine, and the next movement of the lever arms 88 for the purpose of placing another cover on a filled box, results in the pawls 98 being moved past the ends of the first filled box, as previously noted. The subsequent outward movement of the lever arms restoring the plungers or pushers 85 and 108 to the positions shown in Fig. 10, causes said pawls to eject the unclamped filled and capped box from the recess in the magazine, whereupon it falls upon the inclined plate 113, from which it slides into the discharge spout 114 and on to the conveying belt 115.

From the above description it will be noted that after each of the movements of the magazine 34 a box is placed in a recess of said magazine, a previously assembled row of tablets with the paper lining is forced into a previously inserted box, the paper web mid-way between two other filled boxes is clamped and severed, one of the severed ends of the paper lining of another box is folded over the tablets therein, still another filled box is provided with a lid or cover, and another box is ejected. While the magazine is making one of its movements, a length of paper web is being drawn from the supply roll, an assembled row of tablets is gripped and moved by the cams 35 toward the magazine, the brush 71 removes from the periphery of the magazine and the row of tablets in a box, any dust which may have adhered thereto, the second one of the severed ends of a lining is folded over the first end by the apron 61, and certain of the levers 48 are moved to such positions as to unclamp the boxes with which they coöperate, while others are moved to their clamping positions. At the same time, of course, the various portions of the mechanism are moving into the positions which they are required to occupy in order to perform the operations described as occurring when the magazine is at rest.

It will be noted from the above description that my machine materially reduces the labor and time necessary for lining, filling and covering boxes of the class noted and insures the delivery to each of said boxes of a predetermined number of tablets in the desired positions. It will moreover be noted that the machine as a whole is comparatively simple as well as substantial so that it is positive as well as reliable in action. The various parts are conveniently accessible so that in the event of any of the box lids or other parts becoming jammed, the trouble may be quickly found and easily corrected long before they are required for use in the machine.

It is to be understood that while I refer to tablets as the articles assembled and placed in boxes by my machine, bodies of other forms, may be operated on without departing from or essentially modifying my invention, and in some cases single bodies having the overall dimensions of a row of tablets may be placed in the boxes since it is immaterial whether one or a number of pieces of material in the form of a row be acted on to force the paper lining web into the boxes.

I claim:—

1. The combination in a packaging machine of a carrier formed to receive a succession of boxes; means for delivering rows of tablets radially of the carrier to the boxes supported thereby; and means for capping the filled boxes.

2. The combination in a packaging machine of a rotary magazine formed to receive a succession of boxes; means for simultaneously delivering a plurality of tablets in the form of a row to each of the successive boxes in the magazine; and means for capping the filled boxes.

3. The combination in a packaging machine of a rotary magazine having radial recesses for the reception of a succession of boxes; means for delivering rows of tablets radially of the magazine to the boxes therein; means for capping the filled boxes; and means for automatically ejecting the filled boxes from the carrier.

4. The combination in a packaging machine of a carrier; means for feeding boxes radially into the carrier; means for delivering filling material radially of the carrier into the boxes; means for delivering caps radially of the carrier to the boxes; and means for automatically discharging the boxes from the carrier after they have been filled and capped.

5. The combination in a packaging machine of a carrier; means for feeding boxes thereto; means for filling and simultaneously lining the boxes; means for capping the boxes; and means for automatically discharging the boxes from the carrier.

6. The combination in a packaging machine of a carrier; means for feeding boxes thereto; means for filling the boxes supported by the carrier and simultaneously forcing into them a length of paper web; means for cutting said length from a source of supply of the same; means for capping the boxes; and means for discharging the boxes from the carrier.

7. The combination in a packaging machine of a carrier; means for feeding boxes thereto; means for assembling a succession of substantially parallel rows of tablets; means for delivering the tablets of each row simultaneously into a box; means for capping the boxes; and means for discharging the boxes from the carrier.

8. The combination in a packaging machine of a substantially cylindrical carrier having a series of radial recesses; means for feeding boxes to said recesses; means for filling the boxes; means for placing caps on the boxes; means for clamping the boxes to the carrier while the caps are being placed; and means for ejecting the boxes from the recesses.

9. The combination in a packaging machine of a carrier having a series of recesses; means for feeding boxes to said recesses; means for filling the boxes; means for clamping the boxes and their contents in the recesses; means for capping the boxes; means for releasing the boxes from their clamped condition; and means for ejecting the boxes from the recesses.

10. The combination of a carrier having a series of box receiving recesses; a clamping device for each recess; means for feeding material to the boxes in the recesses; means for causing the box clamping means to occupy a box releasing position at predetermined times; and means for ejecting the boxes at such times.

11. The combination in a packaging machine of a carrier having a series of box receiving recesses; a clamping device for each of said recesses; means for feeding material to the boxes in the recesses; means for ejecting filled boxes from the recesses; and means for releasing the box clamping means while the box is being filled and when it is being ejected.

12. The combination in a packaging machine of a carrier having box receiving recesses; means for supplying a web of lining material adjacent the carrier; mechanism for supplying material to fill the boxes in each of the recesses and simultaneously forcing into each box a lining formed by part of said web; means for periodically cutting the web between the recesses; means for capping the filled boxes; and means for ejecting said boxes from the carrier.

13. The combination of a carrier having a series of box receiving recesses; means for supplying a web of paper adjacent the carrier; a device for simultaneously filling each box and forcing a web of material into the same; a cutter for severing the web between each pair of adjacent boxes; means for folding the ends of the web projecting from each box; and means for successively capping the boxes.

14. The combination of a carrier having a series of box receiving recesses; means for supplying a web of paper adjacent the carrier; means for forcing said web into the box in each recess; means in addition to and independent of the boxes in said recesses for temporarily holding the web in a taut condition; and means for cutting said web while it is so held.

15. The combination in a packaging machine of a carrier having a series of box receiving recesses; means for lining the boxes in said recesses with web material; a device in addition to and independent of the boxes or material in the recesses and successively operative between each two recesses, for temporarily holding said web material in a taut condition; and a cutter for severing the web while it is so held.

16. The combination in a packaging machine of a carrier having a series of box receiving recesses; means for lining boxes in said recesses with web material; a device for temporarily holding said material in a taut condition between each two boxes; a cutter for severing said web while it is so held; and means for capping the boxes after said lining has been cut.

17. The combination of a rotary carrier having a series of box holding recesses; means for feeding material to boxes in said recesses and simultaneously lining them with web material; a device in addition to and independent of the boxes or material in said recesses for clamping the web material to the carrier between each pair of recesses so that it is taut over the same; and a cutter for severing said material while it is so clamped.

18. The combination in a packaging machine of a carrier having a series of box receiving recesses and a slot between each pair of recesses; means for automatically filling the boxes in said recesses and simultaneously lining them with web material; a device in addition to and independent of the boxes or material in said recesses for clamping the web material on each side of a slot between two filled boxes; and a knife operative to cut the web material while said device holds it stretched over the slot.

19. The combination in a packaging machine of a carrier having a series of box receiving recesses and provided with a slot between each pair of adjacent recesses; a reciprocating knife; means for successively filling the boxes in said recesses and at the same time lining them with web material; two spring pressed arms placed to coöperate with the carrier to clamp the body of web material thereto on opposite sides of a slot; and means for periodically actuating the knife to sever the web material over said slot while it is held by said spring pressed arms.

20. The combination in a packaging machine of a carrier having a series of box receiving recesses; means for successively feeding rows of tablets to boxes in said recesses and at the same time forcing into the boxes a lining of web material; two spring arms mounted to co-act with parts of the carrier between each pair of boxes to hold the web material in a taut condition; and a knife for periodically cutting said web material while it is held by said arms.

21. The combination in a packaging machine of a carrier having box receiving recesses; means for intermittently turning said carrier; means for supplying a web of material adjacent said carrier; means for supplying a row of tablets to each of the boxes in the respective recesses of the carrier and at the same time drawing thereinto a length of the web material; means for automatically cutting the web material between each two boxes after they have been filled; means for folding the ends of said web material after they have been cut; and means for thereafter capping the boxes.

22. The combination of a movable carrier having a series of box holders; means for feeding boxes to said holders; means for feeding material into boxes in the holders; and mechanism for causing each box to be clamped in its holder after its introduction thereto and after it has been filled, the clamping mechanism releasing the box during the filling operation.

23. The combination of a carrier having box holders; means for feeding boxes to said holders; means for supplying paper lining for the boxes adjacent certain of the holders; means for simultaneously forcing a body of material and said lining into each box; and mechanism for temporarily clamping the material in each box after it has been placed therein.

24. The combination in a packaging machine of a carrier having a series of box holders; means for feeding boxes to said holders; means for simultaneously lining and filling boxes in the holders; means for capping boxes in the holders after they have been filled; means for ejecting the capped and filled boxes; with means for clamping each box within its holder before and after it is filled, and releasing the box during the operations of filling and ejecting mechanism.

25. The combination of a movable carrier having a series of box holders; means for feeding empty boxes to the carrier; means for supplying a web of lining material adjacent the carrier; means for feeding filling material to each box and at the same time forcing thereinto a body of the lining material; means for cutting said web between each two filled boxes; means for capping the boxes; and mechanism for clamping boxes in the holders during the operation of the web cutting means, and releasing them while they are being filled and after they have been capped.

26. The combination of a rotary carrier having box holding recesses; means for feeding empty boxes to said recesses; means for supplying a web of lining material adjacent the carrier; means for simultaneously forcing filling material into the boxes and lining them with said web; means for severing the web of lining material between each pair of boxes; means for folding the ends of the lining material; means for applying a cap to each box; means for successively ejecting the boxes; and mechanism for clamping the boxes in the recesses, said mechanism being formed to release said boxes while they are being filled and while they are being inserted and ejected.

27. The combination in a packaging machine of a carrier having means for holding a plurality of boxes; a device for feeding a succession of boxes to said carrier; means for filling the boxes with material; a device for capping the filled boxes; and an operating member for causing the box feeding device to deliver a box to the carrier at the same time that the capping device places a cap on a filled box.

28. The combination in a packaging machine of a carrier having means for holding a plurality of boxes; a device for feeding a succession of boxes to said carrier; means for filling the boxes with material; a device for capping the filled boxes; and a member common to both of said devices for causing one of them to deliver a box to the carrier at the same time the other is caused to place a cap on a filled box; with a box ejecting device also actuated by said member.

29. The combination in a packaging machine of a carrier having means for holding a series of boxes; a device for feeding boxes to the carrier; a device for ejecting boxes from the carrier; a third device for applying caps to boxes; mechanism for filling boxes supported by the carrier; and a lever for actuating the box feeding and box capping devices; the box ejecting device being connected to said lever to remove a box from the carrier after the operation of the other two devices.

30. The combination in a packaging machine of a rotary carrier having means for receiving a series of boxes; a Geneva gear for intermittently rotating said carrier; with devices for delivering a box to the carrier, filling a second box on the carrier, capping a filled box, and ejecting a fourth box, between the movements of said carrier.

In testimony whereof, I have signed my name to this specification, in the presence of two subscribing witnesses.

JOSEPH PERCY REMINGTON.

Witnesses:
WILLIAM E. BRADLEY,
WM. A. BARR.